(12) United States Patent
Ivtsenkov

(10) Patent No.: US 7,551,813 B2
(45) Date of Patent: Jun. 23, 2009

(54) SIMPLIFIED FIBER-OPTIC SWITCH FOR ALL-OPTICAL FIBER-OPTIC LINES

(76) Inventor: Gennadii Ivtsenkov, 386 Rexford Drive, Hamilton, ON (CA) L8W 3Y7

( * ) Notice: Subject to any disclaimer, the term of this patent is extended or adjusted under 35 U.S.C. 154(b) by 0 days.

(21) Appl. No.: 11/941,948

(22) Filed: Nov. 18, 2007

(65) Prior Publication Data
US 2008/0124022 A1  May 29, 2008

Related U.S. Application Data

(63) Continuation of application No. 11/163,917, filed on Nov. 3, 2005.

(51) Int. Cl.
*G02B 6/26* (2006.01)
*G02B 6/42* (2006.01)
*G02B 6/36* (2006.01)
*G02B 6/44* (2006.01)

(52) U.S. Cl. .............. 385/16; 385/19; 385/25; 385/31; 385/32; 385/53; 385/100; 385/103; 385/113

(58) Field of Classification Search ........... 385/16, 385/19, 25, 31, 32, 53, 100, 103, 113
See application file for complete search history.

(56) References Cited

U.S. PATENT DOCUMENTS

| 5,050,945 | A  | * | 9/1991 | Sorensen ............... 385/95 |
| 6,683,392 | B2 | * | 1/2004 | Reinhardt et al. ....... 307/113 |
| 2002/0090168 | A1 | * | 7/2002 | Bartels ................. 385/16 |
| 2004/0047583 | A1 | * | 3/2004 | Chiba et al. ........... 385/140 |
| 2005/0047745 | A1 | * | 3/2005 | Ao et al. .............. 385/140 |

* cited by examiner

*Primary Examiner*—Frank G Font
*Assistant Examiner*—Jerry Blevins

(57) ABSTRACT

Simplified and insensitive to ambient condition mechanical bi-directional fiber-optic switch that can work in fire and explosion hazardous environment. The switch houses a sensitive element—a length of single-mode optic fiber and a bending device, which being activated provides specific bending of the optic fiber that introduces high attenuation of an optic signal so completely terminating light signal transmission. The switch can be configured as single on/off switch or multi-channel one.

2 Claims, 3 Drawing Sheets

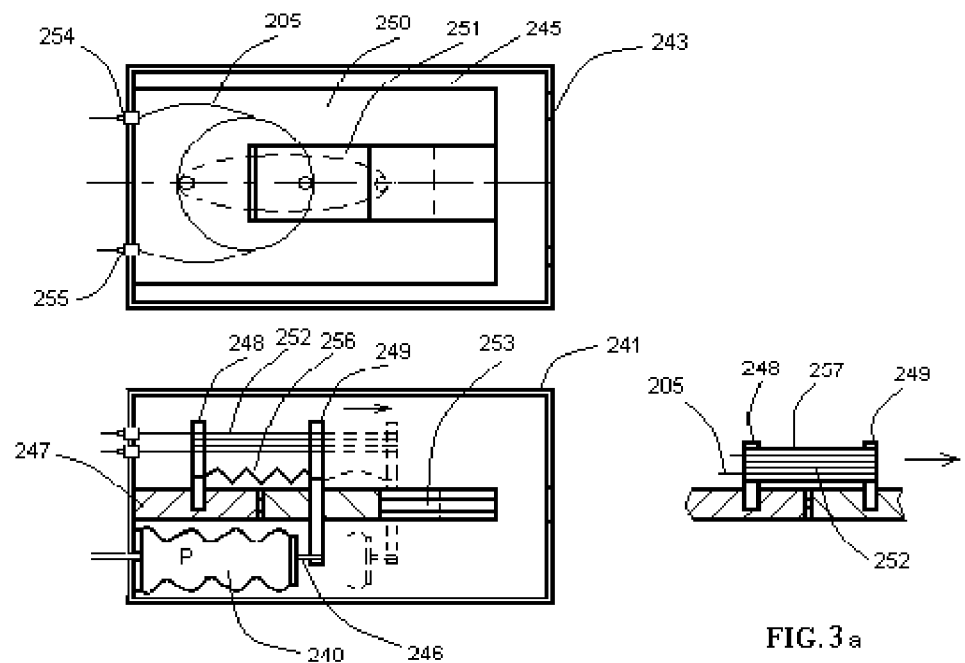
FIG. 3
FIG. 3a
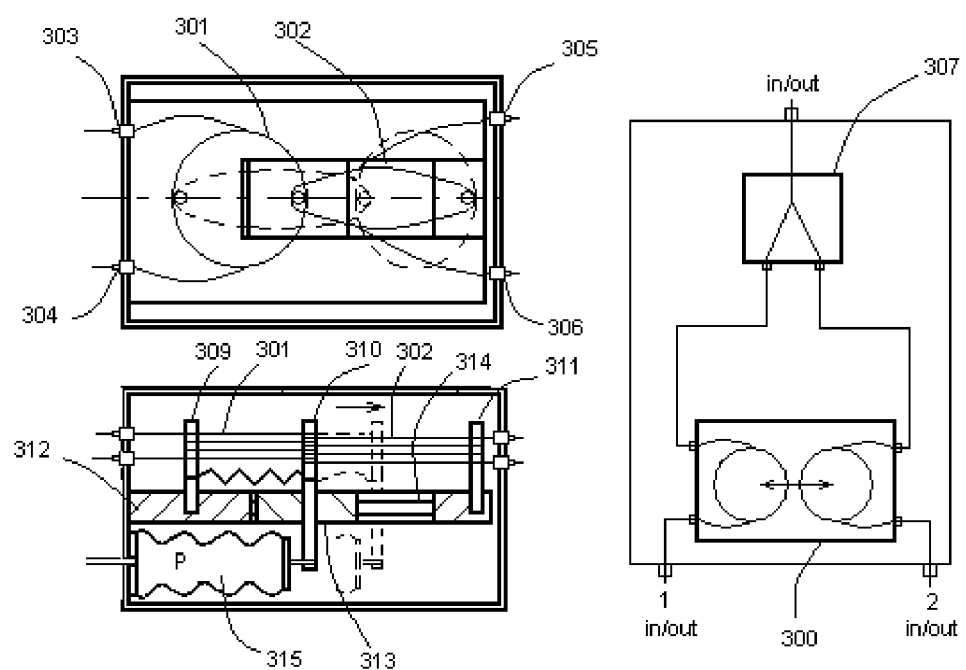
FIG. 4
FIG. 4a

SIMPLIFIED FIBER-OPTIC SWITCH FOR ALL-OPTICAL FIBER-OPTIC LINES

CROSS-REFERENCE TO RELATED APPLICATIONS

This application is related to U.S. patent application Ser. No. 11/163,917 filed 2005 Nov. 3.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATED-BY-REFERENCE OF MATERIAL SUBMITTED ON A COMPACT DISK

Not Applicable.

FIELD OF THE INVENTION

The present invention relates to photonic switching technologies. More particularly, the invention relates to mechanical fiber-optic switches—the elements of fiber-optic lines, such as telecommunication or data acquisition ones.

BACKGROUND OF THE INVENTION

All-optical fiber-optic lines require light signal transmission along the line without its conversion into electrical one and vise versa. For this purpose a number of all-optical switches based on different technologies were introduced.

There are a few technologies of all-optical switching utilized now in fiber-optic telecommunication lines, such as:
  MEMS switching technology,
  Acousto-optic switching technology,
  Mechanical switching technology.

To connect fiber-optic channels, MEMS switches utilize electrically-controlled movable micro-mirrors. Acousto-optic switches utilize deflecting property of acoustic wave running in special crystals, such as TeO2 ones. Mechanical switches utilize movable optic fibers to connect fiber-optic channels. There are some attempts to utilize other physical effects for this purpose, such as electro-optics, micro-bubble, etc., but switches based on these effects still under development and do not reveal characteristics suitable for fiber-optic lines.

The switching technologies mentioned above have its individual pattern of application. For example, MEMS switch can provide multi-channel (up to hundred channels) N×N cross-connection and have switching time of 1 millisecond and more. Acousto-optic switches provide multi-channel (up to thousand channels) 1×N and N×1 connections with switching time of 3-5 microseconds.

Mechanical switches can connect a few fiber-optic channels at low speed, such as 1 second and more. Therefore, the mechanical switches can be successfully utilized where high-speed-switching is not required, for example, in multi-channel fiber-optical laboratory measuring devices and in fiber-optic telecommunication lines as switches for channel regeneration.

Existed mechanical fiber-optic switches use mechanical movement of open-end optic fiber, which, being controlled by precession mechanical actuator is going to close proximity with another optic fiber in such a way that allows transmitting light through a tiny gap between the fibers.

Such solution has obvious disadvantages:

The actuator has to have accuracy of a couple microns; otherwise optical losses will be very high. The switching time of such mechanical switches is around of a few seconds. Because of this, such switches can find limited applications. Also, all mentioned fiber-optic switches including MEMS and acousto-optic ones have open space, where the spatial switching is performed. So, all elements of such switches have to have enough strength to keep position of elements with preciseness of a couple microns. Also, all mentioned switches are electronic-controlled ones, so it requires special electronic drivers that do not allow utilizing them in fire or explosive-hazardous environment.

The object of the present invention—a mechanical fiber-optic switch—utilizes phenomenon of increasing of light attenuation induced in single-mode optic fiber under its bending.

In these fibers, the single-mode light propagation is based on light diffraction and the bending changes diffraction-conditions so introducing additional light attenuation.

The experiments conducted by the author of the present invention reveal following features of a single-mode fiber:

The light attenuation depends on the fiber bending radius and arc angle of the bending.
  If bending radius of a length of single-mode optic fiber becomes smaller than about 9 mm, the intensity of a single-mode light running in the fiber gradually declines.
  When the bending radius becomes smaller than two millimeters, the light transmission is completely terminated. This effect appears in a conventional 9/125-micrometer single-mode optical fiber.

These experiments show that a single-mode light attenuation introduced by the bending of a single-mode fiber can be described by formula:

$$P_{out}/P_{in}=[f(r)]^\phi \qquad (1),$$

where f(r)—the function of light attenuation from radius of bending, $\phi$—arc angle of bending (in radians), $P_{in}$—input power of the light and $P_{out}$—output power. Because in telecommunication industry signal amplification and attenuation is measured in decibels (A [dB]=10 log $P_{out}/P_{in}$), the formula above can be transformed into the logarithmic one. Thus, this formula (for fixed-radius arc) looks as:

$$A\,[dB]=F(r)\phi \qquad (2),$$

where F(r)=log f(r) and $\phi$—arc angle of bending (in radians).

For variable radius this formula looks as:

$$\delta A\,[dB]=F(r)\delta\phi \qquad (3).$$

Here, F(r) can be defined as the specific attenuation [dB/rad].

Because freely bent silica fiber has complicated shape, not a circular one, F(r) varies along the fiber, and this formula looks as:

$$A\,[dB]=\Sigma(\delta A_i)=\Sigma F(r_i)\delta\phi \qquad (4).$$

The function of specific attenuation F(r) (in dB/rad) from radius of bending (r) taken at 1310-nm wavelength is shown on FIG. 1. It is a non-linear one that significantly increases for lesser radius and asymptotically rises at 2.5-mm radius. This dependence in the first approximation can be described by the formula (for 9/125 single mode fiber, 1310-nm wavelength and radius range from 3.5 mm to 8 mm):

$$F(r)=(4.4/r)^{4.6} \quad (5),$$

where F(r) is taken in dB/rad, and r—in mm.

The total attenuation A linearly depends on the angle of bending. It means that attenuation (measured in dB) is twice higher for 360-degree loop than for 180-degree arc. For example, attenuation measured for 9.6-mm bending diameter and 180-degree arc is 2.2 dB at 1310-nm wavelength, and for 360-degree loop of the same diameter is 4.4 dB. When the fiber is coiled as a multi-turn winding, the attenuation (in dB) increases proportionally to the number of turns. Thus, the formula for total light attenuation (1310-nm wavelength) induced in the multi-turn winding can be described by the formula:

$$A\,[dB]=2\pi N(4.4/r)^{4.6} \quad (6),$$

where radius r is taken in mm, and N—the number of turns.

Therefore, utilizing variable-shape multi-turn coil of optic fiber it becomes possible to use higher radii of the bending, such as 6-7 mm. In this case, because the range of working displacement becomes larger, mechanical fatigue of the fiber and probability of its failure appearing after number of bending become much smaller and does not decline switch lifetime.

Basing on mentioned above experiments, the method of the fiber bending and a bending device were developed and implemented in fiber-optic switch—the object of the present invention.

The research conducted by the author of the present invention also reveals that there are a couple of principles of fiber bending that was further utilized in the present invention, which can allow creating the fiber-optic switch with stable parameters. One of these principles is to avoid sharp bending. Such bending produces high attenuation, but it is unstable, affected by small unwanted displacements and can cause the fiber failure. Also, to avoid unwanted bending of intermediate parts of the optic fiber, the fiber ends has to be tangential to the fiber loop. For example, for circular (or elliptical) multi-turn winding, the end fibers have to be tangential to the winding. In the case of bending around a fixed radius shaft, the end fibers, also, has to be tangential to the shaft circle. Those principles are described by the drawings on FIG. 2.

FIG. 2 A depicts the bending method that, in particular, was utilized in fiber-optic gage described in U.S. Pat. No. 5,818, 982 issued Oct. 6, 1998 to Voss. Here, freely bent fiber has a complicated Ω shape with sharp bent parts. These parts provides high attenuation, but they are unstable, affected by small unwanted displacements and can cause the fiber failure.

To solve this problem, the transformation of multi-turn circular winding into elliptical one was proposed in a number of patents and patent pending, such as U.S. Pat. No. 5,050,946 issued to Sorensen, Us Patent applications No 2004/0047583 and 2005/0047745. Here authors proposed multi-turn windings of optical fiber that freely coiled between two rods in such a way that, when the rods are shifted, the coil is stretched into elliptical one so introduce high attenuation of optical signal running in the coil. Therefore, such attenuation completely closes the optical circuit where the coil is installed.

Experiments conducted by the author of the present invention reveal that freely coiled between two rods is not stable because the plane of the winding moves in shifting sequences (if the rods does not have special groves for each individual turn of fiber). The natural flexure of optic fiber utilized in such design, unlike specially-designed metal spring, is not stable and, anyway, is affected by fatigue.

Therefore, this design has to be improved by utilization of spring mandrel fixed between the rods, wherein the optical fiber is reeled and fixed on the cylindrical surface of the mandrel. Initially, the mandrel has circular shape; and it is transformed into elliptical one when the rods stretch the mandrel. Thus, all mechanical stresses are applied to the mandrel, not to optical fiber. This solution was utilized by the author of the present invention in the fiber-optical gage described in U.S. patent application Ser. No. 11/163,917. Also, the end fibers connecting the winding with fiber-optical connectors are tangentially positioned to the fiber curve. So, the end fiber is not bended when the winding is stretched. FIG. 2 C depicts transformation of multi-turn winding from circular into elliptical one. [That technology was utilized in fiber-optic gages described in U.S. patent application Ser. No. 11/163,917 filed by the author of the present invention and in fiber-optic switches of the present invention.]

Here, such transformation is performed by radial stretching of the winding. In this case, the curvature of the fiber reeled on the mandrel is changed together with the curvature of the mandrel according to the mathematics formulas derived by the author of the present invention; it is predictable and stable. Also, the end fibers are tangentially positioned to the fiber curve. The light attenuation produced by such bending can be calculated by formulas (4) and (5). Therefore, this solution allows creating on-off fiber-optic switches. These switches, unlike to mentioned above conventional fiber-optic switches, do not have any air gaps, do not require precession actuator and can be powered by any mechanical movement. Such advantages allow utilizing not electrical actuators, such as pneumatic ones. Therefore, these switches can work in variety of ambient conditions including underwater and, also, fire and explosive-hazardous ones. The switches together with fiber-optic gages described in U.S. patent application Ser. No. 11/163,917 can be utilized in all-optical fiber-optic data acquisition systems working in such hazardous facilities as oil refinery, oil wells, gas pipelines, chemical factories, munitions deport, etc. In these cases the switches can be powered by compressed nitrogen, for example. Such data collecting system can perform programmable monitoring of remote objects gathering information from large number of the optic gages.

For multi-channel switching, these on-off switches are connected to fiber-optic splitter/combiner. Such combination allows switching single-mode fiber-optical lines in time sequences. These data acquisition system allows utilizing regular single-mode fiber-optical lines, similar to ones used for telecommunication. It can be "dark fibers" or any fiber-optical telecommunication lines modified for transmission of analog signal.

OBJECT OF THE INVENTION

It is an object of the present invention to provide a low cost, simplified and insensitive to ambient conditions mechanical fiber-optic switch for all-optical data acquisition systems and telecommunication lines.

SUMMARY OF THE INVENTION

The present invention alleviates the disadvantages of the prior art by utilization of the phenomenon of single-mode light signal attenuation caused by the specific bending of single-mode optic fiber in a bending device that transforms initially circular shape of multi-turn coil of optic fiber into elliptical one and vise versa. The design of said bending device was also described in U.S. patent application Ser. No. 11/163,917 filed 2005 Nov. 3 by the author of the present invention, where it was utilized in fiber-optic gages. Such transformation can induce high attenuation of light signal so allows performing sequential switch on/switch off actions.

THE DRAWINGS

FIG. 3 depicts an embodiment of the object of this invention—on/off fiber-optic switch.

FIG. 4 depicts an embodiment of the object of this invention—1×2/2×1 fiber-optic switch.

Figure 1:
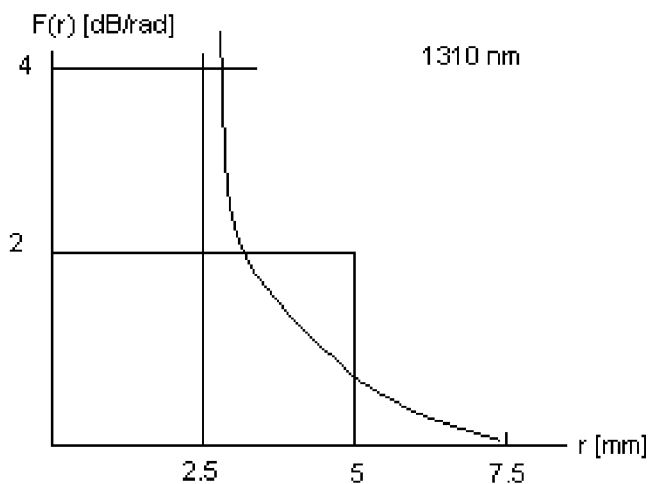
FIG. 1 represents the graph of function of specific attenuation F(r) from radius of bending taken at 1310-nm wavelength.
Figure 2:
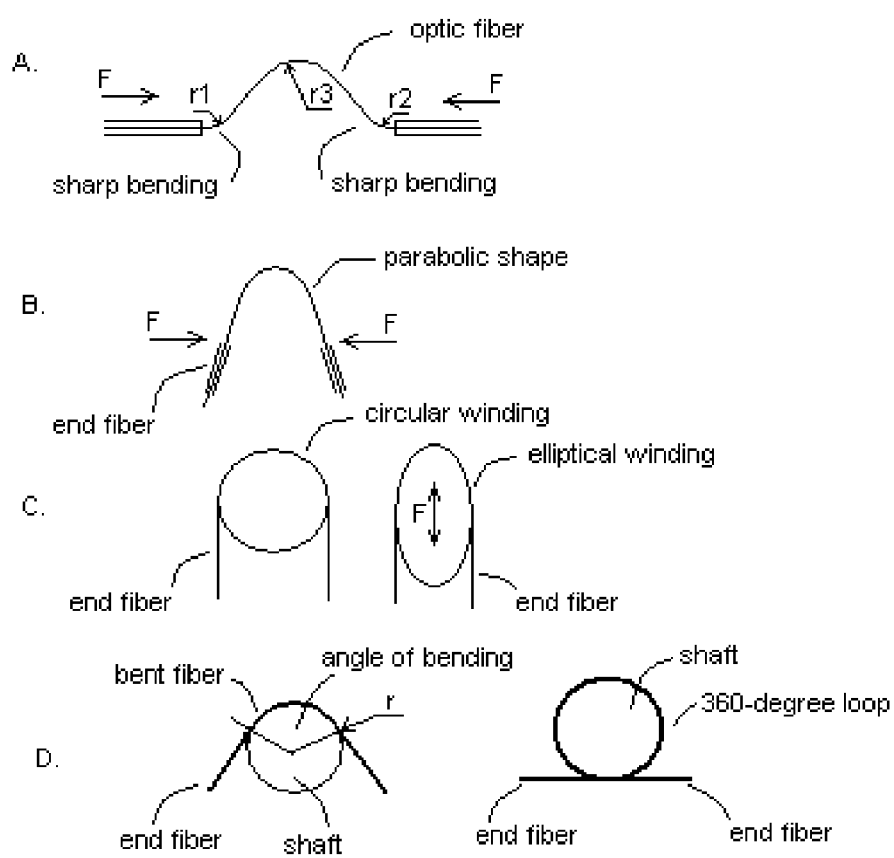
FIG. 2 depicts the principles of fiber bending.
Figure 5:
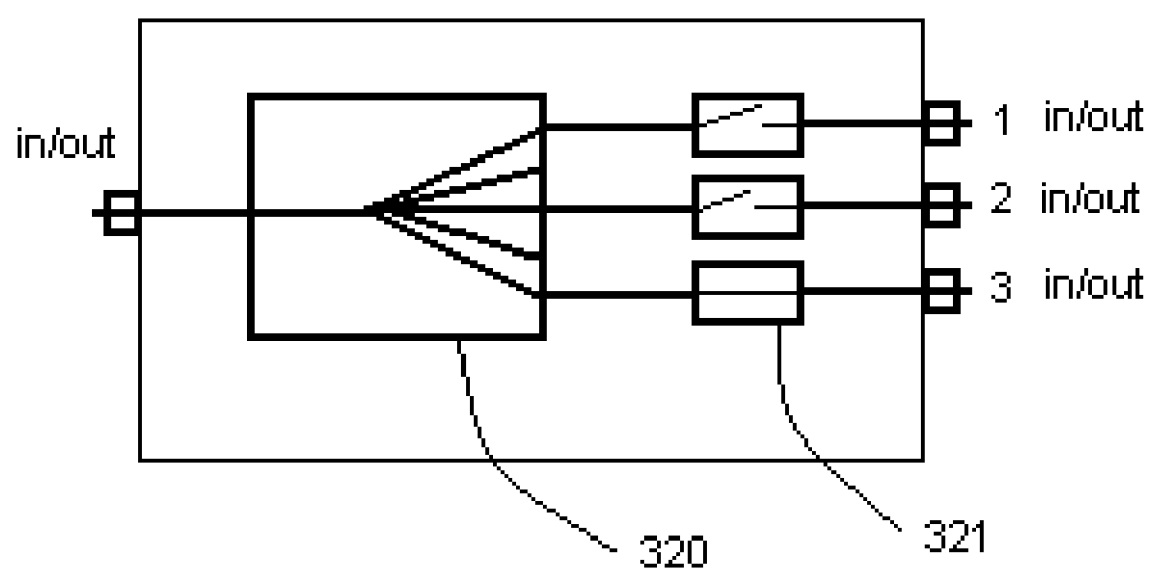

FIG. 5 schematically depicts an embodiment of the object of this invention—1×N/N×1 fiber-optic switch.

DETAILED DESCRIPTION OF THE PREFERRED EMBODIMENTS OF THE PRESENT INVENTION

On/Off Bi-Directional Fiber-Optic Switch

Switch can be configured as depicted in FIG. 3. The switch incorporates the bending device utilized in fiber-optic gages invented by the author of the present invention and described in U.S. patent application Ser. No. 11/163,917, and a mechanical actuator shifting position of said bending device that changes initially circular shape of multi-turn single-mode fiber-optic coil 252 into elliptical one and vise versa. In this embodiment the actuator moves the rod 249 of the bending device in the position when the stretched coil of optic fiber 252 introduces high attenuation of the light signal running in the fiber so completely terminating the signal transmission. The actuator 212 may utilize any mechanism, which provides necessary linear movement, such as manual one, electromagnetic solenoid, step motor, air cylinder, etc.

In the example of this embodiment depicted in FIG. 3, said actuator is powered by compressed gas that does not support burning process, such as nitrogen, carbon dioxide, helium, etc. This solution provides complete fire protection, so said switch can be utilized in fire and explosive-hazardous areas, such as oil refineries, gas pipelines, chemical factories, munitions deports, etc.

The switch works as follows:

Pressure of the gas powering said actuator is transformed into bending of measuring fiber 205 by extending device—a cylindrical chamber 240 installed in a box 241, wherein chamber 240 having flexible corrugated cylindrical walls is internally exposed to the gas pressure, and the box 241 has openings 243 to allow outside pressure externally affecting the chamber 240. Because of this, the gas pressure extends the chamber 240. The bottom of the chamber 240 is connected to shaft 246 translating the chamber 240 extension to a bending device 247. In this embodiment, the chamber 240 can be substitutes by air cylinder or any device extending under applied gas pressure.

The bending device 247 is based on shape transformation of multi-turn coil of single-mode optic fiber. The bending device contains frame 245 and two low-radius cylindrical rods (holders) 248 and 249 having special groves for each individual turn of the fiber (FIG. 3), around which the fiber 205 is freely coiled as a circular winding 252. In this embodiment, according to research conducted by the author of the present invention, diameter of the winding 252 have to exceed 10 mm; and diameter of rods 248 and 249 has to lay between 1 mm and 3 mm. Such dimensions provide open/close range of switch attenuation from 1 to 50 dB also preventing the winding 252 from mechanical fatigue. The fiber 205 optically coupled to fiber-optic connectors 254 and 255. The rod 248 is mounted on stationary part of the frame 250 that is firmly fixed to the box 241. The rod 249 is mounted on movable part of the frame 251 that can slide in slot 253. Therefore, the distance between rods 248 and 249 can be extended that transforms the shape of the winding 252. A spring 256 provides additional force that pulls the rods together preventing them from accidental movement.

When pressure P is applied, the chamber 240 (or air cylinder) axially elongates pushing the movable part of the frame 251 with the rod 249. Thus, the coil 252 changes its shape from circular to elliptical one, and the radius of fiber bending declines in the parts of the ellipse, where the coil 252 touch the rods 248 and 249. Therefore, fiber 205 experiences the bending that changes attenuation of light passing the fiber. Because the total attenuation (in decibels) of the light signal is the sum of attenuations caused by single bending, the multi-turn elliptical winding having 2N low-radius bending (where N is the number of turns) allows proportionally increasing light attenuation induced by the bending. Changing flexibility of the extending device and the spring 256 allows adopting the switch to feeding pressure.

Therefore, when the actuator is in initial position, the coil 252 has circular shape that does not attenuate the light signal running in the fiber 205 and the switch is open (in ON position). When the actuator 240 pushes the rod 249, the coils 252 shift the shape to elliptical one, which introduces high attenuation of the light signal running in the fiber 205 so completely terminating the light transmission. Thus, the fiber-optic switch becomes closed (in OFF position). The switch is bi-directional one, so it bidirectional ones, the switch can work in both directions: time-sequentially connecting the single input can work in both directions: time-sequentially switching on/off light signal passing the switch.

In this embodiment, any kinds of extending devices, such as hollow cylinder, hollow spiral, air cylinder or flexible plastic bags expanded under applied pressure can be utilized.

The embodiment of the bending device 247 can be modified to use flexibility of special element instead of utilization of the natural flexure of the optic fiber 205. The part of the bending device 247 utilizing a spring as a flexible element is depicted in FIG. 3a. In this case, the bending device 247 additionally comprises a cylindrical spring mandrel 257 mounted on the rods 248 and 249 in such a way that the mandrel 257 has a circular shape when the gage is not affected by pressure. The winding 252 is reeled and fixed on cylindrical surface of the mandrel 257. Therefore, when the rod 249 moves, the mandrel 257 changes its shape from circular to elliptical one, and the winding 252 experiences the same shape transformation. Here, the spring 256 pulling the rods 248 and 249 together (FIG. 3) can be eliminated.

This approach allows simplifying the technological procedure of the fiber coiling, also providing more reliable, repeatable and stable switch characteristics because in such design all mechanical stresses are applied to the mandrel, not to the optical fiber.

Another Embodiment of the Present Invention

Bidirectional 1×2/2×1 Fiber-Optic Switch

Another embodiment of the invention is shown on FIG. 4 and FIG. 4a. Here, the light attenuation induced in bent fiber is utilized in a bidirectional fiber-optic switch sequentially connecting single input with two outputs that provides 1×2/2×1 configuration. The switch comprises a fiber-optic splitter/combiner 307 and on/off module 300 (FIG. 4a). The module 300 utilizes the same principle that is used in on/off switch depicted in FIG. 3—the light attenuation induced by stretching of multi-turn fiber-optical coil.

In this embodiment (FIG. 4), the module 300 contains two separate multi-turn coils 301 and 302 containing single-mode optic fiber, which ends are connected to fiber-optic connectors 303, 304, 305 and 306. The coils 301 and 302 are wound around rods (holders) 309, 310 and 311, where the rods 309 and 311 are the stationary ones and the rod 310 can move along the frame 312. The rods 309 and 311 are firmly mounted on stationary frame 312. The rod 310 is mounted on movable frame 313 that can slide in the slot 314 machined in the frame 312. The movable frame 313 is in mechanical connection with actuator 315. The coil of optic fiber 301 has initially circular shape and it is freely wound around rods 309 and 310. The coil 302 is initially wound around rods 310 and 311 as a stretched ellipse. In the position shown on FIG. 4, the shape of the coil 302 introduces high attenuation of the light completely terminating light transmission, and the coil 301 having circular shape does not induce any attenuation. Therefore, the light signal passes the fiber-optic circuit between connectors 303 and 304 without attenuation, and the optic circuit between the connectors 305 and 306 is closed.

The embodiment of the bending device of the module 300 can be modified to use flexibility of a spring as a flexible element (as depicted in FIG. 3a), such as a cylindrical spring mandrel. This embodiment includes two mandrels, wherein the first mandrel is mounted on the rods 309 and 310; and the second mandrel is mounted on rods 310 and 311 in such a way that the first mandrel has a circular shape when the gage is not affected by pressure and the second one is stretched. The coils 301 and 302 are reeled and fixed on cylindrical surface of the mandrels. Therefore, when the rod 310 moves, the first mandrel changes its shape from circular to elliptical one; and the second mandrel changes shape from elliptical to circular one, so the windings 301 and 302 experience the same shape transformation.

Therefore, when the actuator 315 pushes the rod 310, the coils 301 and 302 shift the shape—the coil 301 becomes elliptical and the coil 302—circular. Thus, the fiber-optic circuit (inside the module 300) between connectors 303 and 304 becomes closed, whereas the circuit between connector 305 and 306—opened. The switch contains the splitter/combiner 307 (FIG. 4a) whose outputs are in optical connection with connectors 303 and 305 of the module 300. Therefore, the on/off module 300 sequentially opens and closes each output of the splitter/combiner 307 providing time-sequential switching of the light signal between outputs 1 and 2 (FIG. 4a).

Because the splitter/combiner 307 and optical circuits of the module 300 are bi-directional ones, the switch can work in both directions: time-sequentially connecting the single input to two outputs (1×2-configuration) or connecting any of two inputs with the single output (2×1-configuration).

The switch can be cascaded and works in N×N configuration. The number of switched channel is restricted by attenuation introduced by the splitter/combiner, whereas the attenuation introduced by opened optical circuit (circular-shaped fiber-optical coil) of the module 300 does not exceed 0.2-0.3 dB. Therefore, the total attenuation of the opened channel ("insertion loss") is about 3.5 dB for two outputs, and increases up to 10 dB for ten outputs.

Because the switch works in on-off mode only it does not require precise attenuation/bending characteristics, a step-index multi-mode fiber can be also utilized here. Such multi-mode switch can be used in multi-mode fiber-optical lines.

The coil and rod dimensions can be recommended based on the research conducted by the author of the present invention. Therefore, diameter of the circular coil (mandrel) has to exceed 10 mm (or length of mandrel's circumference has to exceed 30 mm), and diameter of the rods has to lie between 1 and 3 mm.

The 1×2 single-mode fiber-optic switch of this embodiment was prototyped and tested. The module 300 of the prototype contains two 9/125 single-mode optic fiber coils of 40-mm diameter having three turns. The operational travel of the rod 310 is 16 mm. The test reveals the total "insertion loss" of 3.5 dB (opened channel) and 55 dB "crosstalk" (closed channel) at 1550 nm. The switch, also, was tested for periodical switching with the switching time of 0.5 sec. The tests reveal that the switch provides reliable and stable characteristics without permanent deformation of the optical fiber (coils 301 and 302).

The actuator 315 pushing the rod 310 may be based on any mechanism, which provides necessary linear movement, such as electromagnetic solenoid, step motor, air cylinder, etc. In the case of the air cylinder (shown on FIG. 4), compressed gas (nitrogen, helium, etc.) feeds the cylinder so pushing the rod 310. This embodiment can be useful for all-optical networks installed on sites, where any electrical devices are not allowed.

Another Possible Embodiment of The Present Invention

Bi-Directional Fiber-Optic Multi-Channel Switch

Another embodiment of the invention—fiber-optic multi-channel switch and controlled splitter/combiner—is depicted in FIG. 5. In this embodiment, a multi-channel 1×N splitter/combiner 320 with N outputs is optically connected to N on-off switches 321 (of the preferred embodiment) [described above] in such a way that each output of the splitter/combiner is in optical connection with one on-off switch. If all of these on-off switches are not activated, the multi-channel switch works as 1×N splitter/combiner. When the on-off switch is activated, it terminates signal transmission between the splitter/combiner input and the output where this on-off switch is installed. To switch the splitter/combiner input to any single output, all on-off switches have to be activated, except the single on-off switch, which is connected to this output. Therefore, all optical ways, where the on-off switches are activated, are closed; and only one way with not-activated on-off switch is opened. When not only one, but a number of channels are opened, the switch works as a controllable splitter/combiner combining optical signals coming from open channels.

The fiber-optic switch of this invention can be used in fiber-optical networks, such as telecommunication ones and all-optical data acquisition systems.

From the foregoing exposition, those skilled in the fiber-optic switching art will recognize that the invention can be embodied in forms different from those described in the foregoing exposition. Therefore, it is intended that this invention not be limited only to the embodiments shown or described in this specification. Rather, it is intended that the scope of this invention be construed in accordance with the appended claims.

What is claimed is:

1. A bi-directional fiber-optic on/off switch comprising:

a bending device having a first cylindrical rod and a second cylindrical rod, wherein said first rod is the stationary one and said second rod has ability to be linearly shifted from a first position to a second position so extending the distance between said rods;

a length of single-mode optic fiber having input and output ends and freely coiled as a multi-turn circular winding around said first rod and said second rod that is in said first position, which is the closest to said first rod; so, said winding does not attenuate a light signal passing said winding;

a first fiber-optic connector being optically coupled to said input end and a second fiber-optic connector being optically coupled to said output end;

a mechanical actuator, which, when said actuator is activated, moves said second rod from said first position to said second position so extending the distance between said rods and causing said winding to shift its shape from circular to elliptical one, wherein said shape shifting induces high attenuation of said light signal passing said winding so completely terminating transmission of said signal;

wherein the improvement comprises:

said length of a single-mode optical fiber coiled as a circular multi-turn winding, wherein, to prevent said coil from mechanical fatigue and provide open/close range of switch attenuation from 1 to 50 dB, diameter of said coil exceeds 10 mm; and diameter of said rods is in a range from 1 mm to 3 mm;

said bending device modified to use flexibility of cylindrical spring mandrel instead of utilization of the natural flexure of said optic fiber, wherein said bending device additionally comprises a cylindrical spring mandrel mounted on said rods and having a circular shape when said mechanical actuator is not activated; and said winding is reeled and fixed on cylindrical surface of said mandrel;

said mechanical actuator, to make the switch safe in underwater, fire and explosive hazardous environments, comprises—an air cylinder powered by compressed gases that do not support burning processes.

2. A bi-directional fiber-optic switch connecting single input with two outputs comprising:

a. a bending device having a first cylindrical rod, a second low-radius cylindrical rod and a third cylindrical rod, wherein said first rod and said third rod are the stationary ones, and said second rod has ability to be linearly shifted in two positions between said first and third stationary rods;

b. a length of optic fiber having input and output ends and freely coiled as a first multi-turn circular winding around said first rod and said second rod being in a first position that is the closest to said first rod; therefore, said position does not introduces attenuation of a single-mode light signal passing said first winding;

c. a second length of optic fiber having input and output ends and coiled as a second multi-turn winding, wherein said second winding is an elliptical one tightly pulled over said second and third rods; therefore, said first position of said second rod induces high attenuation of a light signal running in said second winding so completely terminating transmission of said signal through said second winding;

d. a mechanical actuator, which, when said actuator is activated, moves said second rod in a second position closest to said third rod causing said first winding to change its shape from circular to elliptical one and said second winding to change its shape from elliptical to circular one; therefore, said second winding, which becomes circular, does not attenuate said light signal running in said second winding, and said first winding, which becomes elliptical, highly attenuates the light signal running in said first winding so completely terminating transmission of said signal running in said first winding;

e. a first fiber-optic connector being optically coupled to said input end of said first winding and a second fiber-optic connector being optically coupled to said output end of said first winding;

f. a third fiber-optic connector being optically coupled to said input end of said second winding, a forth fiber-optic connector being optically coupled to said output end of said second winding, a fifth optic connector;

g. a fiber-optic splitter/combiner having single input, a first output and a second output, wherein said single input is optically coupled to said fifth optic connector, said first output is optically coupled to said first optic connector and said second output is optically coupled to said third optic connector; therefore, when said actuator is not activated, said switch provides bi-directional optical communication between said fifth connector and said second optic connector, whereas optical communication between said fifth connector and said forth connector is terminated, and when said actuator is activated, said switch provides bidirectional optical communication between said fifth connector and said forth connector, whereas optical communication between said fifth connector and said second optic connector is terminated.

* * * * *